United States Patent
Ketchum et al.

(10) Patent No.: US 7,870,056 B2
(45) Date of Patent: *Jan. 11, 2011

(54) MONTAGE FOR AUTOMATED MARKET SYSTEM

(75) Inventors: Richard G. Ketchum, Alexandria, VA (US); Stuart Serkin, Fairfield, CT (US); John Malitzis, Washington, DC (US); Peter Martyn, Ridgewood, NJ (US); Debra Peter, Newfoundland, NJ (US); Patti Dizenhaus, Manalapan, NJ (US); Doug Brown, Washington, DC (US)

(73) Assignee: The NASDAQ OMX Group, Inc., Rockville, MD (US)

( * ) Notice: Subject to any disclaimer, the term of this patent is extended or adjusted under 35 U.S.C. 154(b) by 609 days.

This patent is subject to a terminal disclaimer.

(21) Appl. No.: 11/625,127

(22) Filed: Jan. 19, 2007

(65) Prior Publication Data

US 2007/0136182 A1 Jun. 14, 2007

Related U.S. Application Data

(63) Continuation of application No. 09/401,872, filed on Sep. 23, 1999, now Pat. No. 7,181,424.

(51) Int. Cl.
*G06Q 40/00* (2006.01)
(52) U.S. Cl. .............................. 705/37; 705/35; 705/26
(58) Field of Classification Search ................... 705/26, 705/35, 37
See application file for complete search history.

(56) References Cited

U.S. PATENT DOCUMENTS

| 5,297,031 A | 3/1994 | Gutterman et al. |
| 5,297,032 A | 3/1994 | Trojan et al. ............... 364/408 |
| 6,195,647 B1 | 2/2001 | Martyn et al. |
| 6,272,474 B1 | 8/2001 | Garcia |
| 6,278,982 B1 | 8/2001 | Korhammer et al. |

(Continued)

FOREIGN PATENT DOCUMENTS

WO    WO 91/14231    9/1991

(Continued)

OTHER PUBLICATIONS

Securities and Exchange Commission, Proposed Rule Change, NASD, Inc., Feb. 5, 1999, 61 pps.

(Continued)

*Primary Examiner*—Jagdish N Patel
*Assistant Examiner*—Sara Chandler
(74) *Attorney, Agent, or Firm*—Fish & Richardson P.C.

(57) ABSTRACT

An electronic market for trading of securities includes a plurality of client stations for entering quotes for securities and a server process that receives quotes from the clients, aggregates the quotes and causes a total of all aggregated quotes to be displayed for a plurality of price levels on the client systems. The market uses a graphical user that depicts aggregated quotes in an aggregate window a plurality of price levels of a product traded in the market. The market also includes processes to handle lock/cross market conditions, match-off of order flow and provides a central quote/order collector that interfaces to disparate order delivery systems to minimize dual liability of market makers.

18 Claims, 12 Drawing Sheets

U.S. PATENT DOCUMENTS

| | | |
|---|---|---|
| 6,536,935 B2 | 3/2003 | Parunak et al. |
| 6,629,082 B1 | 9/2003 | Hambrecht et al. |
| 6,631,356 B1 | 10/2003 | Van Horn et al. |
| 7,020,632 B1 | 3/2006 | Kohls et al. |
| 2002/0082967 A1 | 6/2002 | Kaminsky et al. |

FOREIGN PATENT DOCUMENTS

| | | |
|---|---|---|
| WO | WO 98/13778 | 4/1998 |

OTHER PUBLICATIONS

"Nasdaq Workstation II", Nasdaq Stock Market, Inc., May 1999, pp. 1-17, XP002171886 (www.nasdaqtrader.com/trader/tradingservices/productservices/userguides/userguides.stm).

"Self Regulatory Organizations: Notice of Filing of Proposed Rule Change by the National Association of Securities Dealers, Inc.", Federal Register—Securities and Exchange Commission, vol. 64, No. 47, Mar. 11, 1999, pp. 12198-12202, XP002171885 (198.17.75.65/fril/).

Reich, Benny and Ben-Shaul, Israel: "A Componentized Architecture for Dynamic Electronic Markets", Sigmod Record, vol. 27, No. 4, Dec. 1998, pp. 40-47, XP002171887 (www.acm.org).

"Self Regulatory Organizations: Notice of Filing of Proposed Rule Change by the National Association of Securities Dealers, Inc." Federal Register—Securities and Exchange Commission, vol. 64, No. 77, Apr. 22, 1999, pp. 19844-19849, XP002171896 (198.17.75.65/fril/).

MONTAGE FOR AUTOMATED MARKET SYSTEM

This application is a continuation of U.S. application Ser. No. 09/401,872 filed on Sep. 23, 1999 now U.S. Pat. No. 7,181,424, the contents of which are hereby incorporated by reference.

BACKGROUND

This invention relates to trading systems particularly financial trading systems.

Electronic equity markets, such as The Nasdaq Stock Market® collect, aggregate and display pre-trade information to market participants. In The Nasdaq Stock Market, for example, this pre-trade information takes the form of a quote that represents a single or an aggregate of same-priced principal or agency orders. A market such as Nasdaq also provides trading platforms through which market participants may access liquidity indicated in the marketplace.

One interface presentation in the Nasdaq trading system commonly called the Nasdaq Workstation® (hereinafter "NWII") includes an interface having a market minder window which allows market participants to monitor price activity (inside bid/offer and last sale) of selected stocks and a dynamic quote window, which shows for a particular stock the inside bid and offer, the last sale, change in price from previous close, daily high and low, volume, and a short sale arrow indicator. The interface also contains a montage. The montage shows for a particular stock two columns (one for bid, one for ask), under which is listed by market maker identification (MMIDs) for each registered market maker, ECN, and UTP Exchange in the stock, its corresponding quote (price and size) adjacent its MMID. Nasdaq ranks the bids and offers along with the corresponding MMID in price/time priority. Accordingly, the market participant at the best bid who is first in time appears first in the montage, the market participant at the best bid (or the next best bid) who is next in time is ranked second, and so forth.

SUMMARY

The current inability of market participants to submit to a market quotes or orders at multiple price levels has made compliance with the SEC's Order Handling Rules difficult because participants cannot leave their limit orders with a market e.g., Nasdaq for display when required by SEC rules. During fast market conditions, this has resulted in an order being traded through because the market participant cannot transmit a limit order to the market quickly enough via a revised quote.

These developments, in turn, have lead to the proliferation of ECNs, which accept multiple price levels of orders and display those orders when they become the best bid/ask in the ECN. While this has assisted market makers in meeting their quotation and limit order display obligations under the SEC's Order Handling Rules, it has led to increased fragmentation of pre-trade information.

According to an aspect of the present invention, an electronic market for trading of securities includes a plurality of client stations for entering quotes for securities and a server process that receives quotes from the clients, aggregates the quotes and causes a total of all aggregated quotes to be displayed for a plurality of price levels on the client systems.

According to an additional aspect of the present invention, a graphical user interface for an electronic market for trading products includes an aggregate window which displays aggregated quotes for a plurality of price levels of a product traded in the market.

According to an additional aspect of the present invention, a method of operating an electronic market for trading products includes aggregating non-attributable interest in the product for a plurality of price levels.

One or more of the following advantages may be provided by one or more aspects of the present invention.

The trading process enhances the quote montage by providing an aggregation montage for the display of trading interest that shows the best bid/best offer in the market as well as trading interest that is multiple price levels away, accompanied by the aggregate size at each price level of the "displayed" trading interest of market makers, electronic communication networks ("ECN"), and UTP Exchanges.

Quoting Market Participants will be able to display their quotes anonymously at the price levels in the aggregation montage, thus encouraging display of greater trading interest. The montage includes a current quote montage, in which bid and ask quotations along with the participant's unique market maker identification symbol ("MMID") are displayed in price/time priority.

DESCRIPTION

Figure 1:
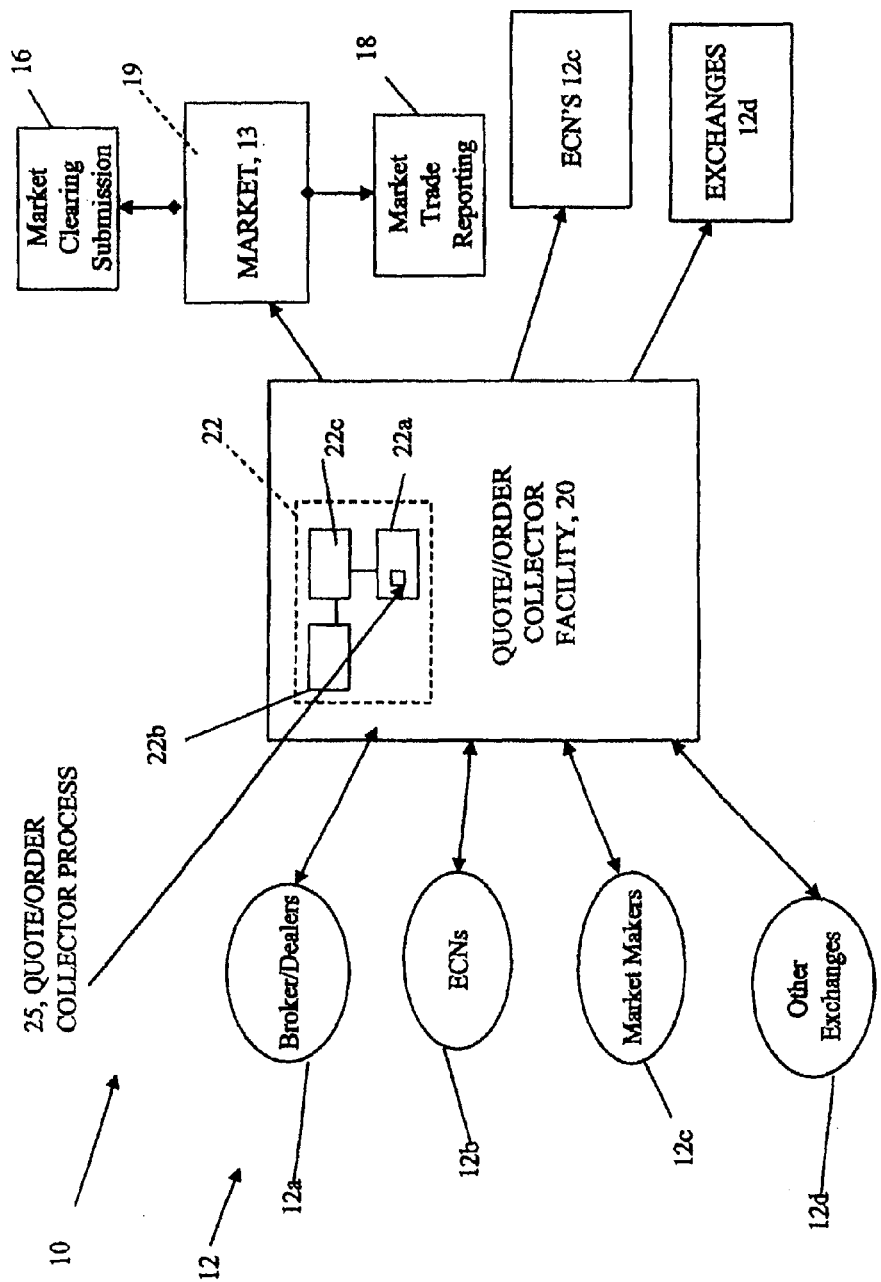
FIG. 1 is a block diagram of a market system.

Referring to FIG. 1, an electronic market 10 is shown. The electronic market 10 includes client systems 12 that access a central quote/order collector facility 20. The client systems 12 can be broker/dealer systems 12a, electronic communication networks (ECN's) 12b, market-maker(s) system(s) 12c, and other exchanges 12d. The connections can use existing Nasdaq® protocols such as SelectNet®, Small Order Execution System (SOES®), and so forth. The client systems 12 include a processor, memory and a storage device, e.g., a client workstation or personal computer (all not shown) that can include a client process to enter quotes/orders into the electronic market system. The quote/order collector facility 20 causes the order execution or order delivery systems (e.g., SOES® and SelectNet®) to deliver executions or orders to a market that is coupled to a clearing system 16 and a reporting system 18. It also causes delivery of executions or routing of orders to the ECN's 12c, depending on the status of the ECN, and routing of orders to other markets and exchanges 12d. The quote/order collector facility 20 is comprised of one or preferably a plurality of server computers generally denoted as 22 including a processor 22a, main memory 22b and storage 22c. The storage system 22c includes quote/order collector process 25 that is executed in memory 22b. In general, server 22 is a complex computer server, the details of which are not important to an understanding of the present invention.

The quote/order collector facility (OCF) 20 collects pre-trade information in the form of quotes or orders. The distinction between a quote and an order depends on several factors. For example, each market maker can send a proprietary quote i.e., a quote that represents its own trading interest or an agency quote that represents trading interest of a sponsored entity. If one proprietary quote is sent it could be considered one order. If one agency quote is sent it also could be considered one order. If an agency quote reflects an aggregation of more than one agency order, however, the aggregate agency order could be considered a quote. Entering quotes are limited to registered market makers 12b and ECNs 12c and possible UTP Exchanges 12d. For any given stock, a registered market maker or ECN may directly enter a non-marketable order i.e., quote into the quote/order collector facility (OCF) 20 on behalf of its customer account, or it may sponsor the direct entry of an order by its customer. All sponsored, quotes are sent to the quote/order collector facility 20 under the name of the sponsoring market maker or ECN. Every registered market maker or ECN will be permitted to submit an unlimited number of non-marketable quotes to the system 20.

Figure 1A:
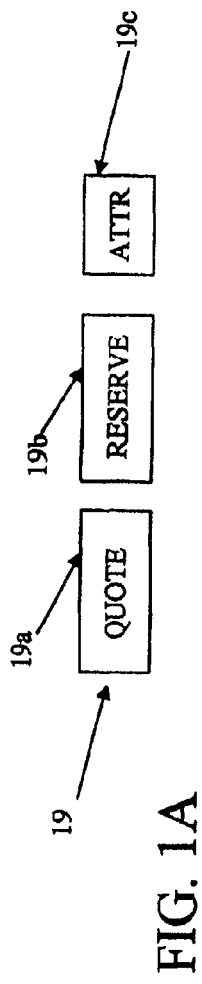
FIG. 1A is a diagram showing a format for quotes.

As shown in FIG. 1A, each quote 19 submitted to the system can included a display quote size 19a, a reserve size 19b and an indication 19c (ATTR) of whether the quote size is attributable or non-attributable. Quote size 19a when attributable based on indicator 19c, is directly attributable to the market maker or ECN and is displayed in an "current quote" montage an order display window 200 to be discussed below in FIG. 9. Quote size 19b when non-attributable is size that the market maker or ECN wishes to display to the marketplace through an aggregate montage of the order display window 200 discussed below in FIG. 9. This quote size 19a is not attributable to the market maker or ECN until it is executed. Reserve size 19b is size that is not displayed to the marketplace but that is immediately accessible through the quote/order collector facility 20. In order to use reserve size 19b, a market maker can be required to have a minimum amount displayed in the aggregate quote size 19a without attributable indicator 19c and negotiation quote with attributable indicator 19c asserted.

Figure 9:
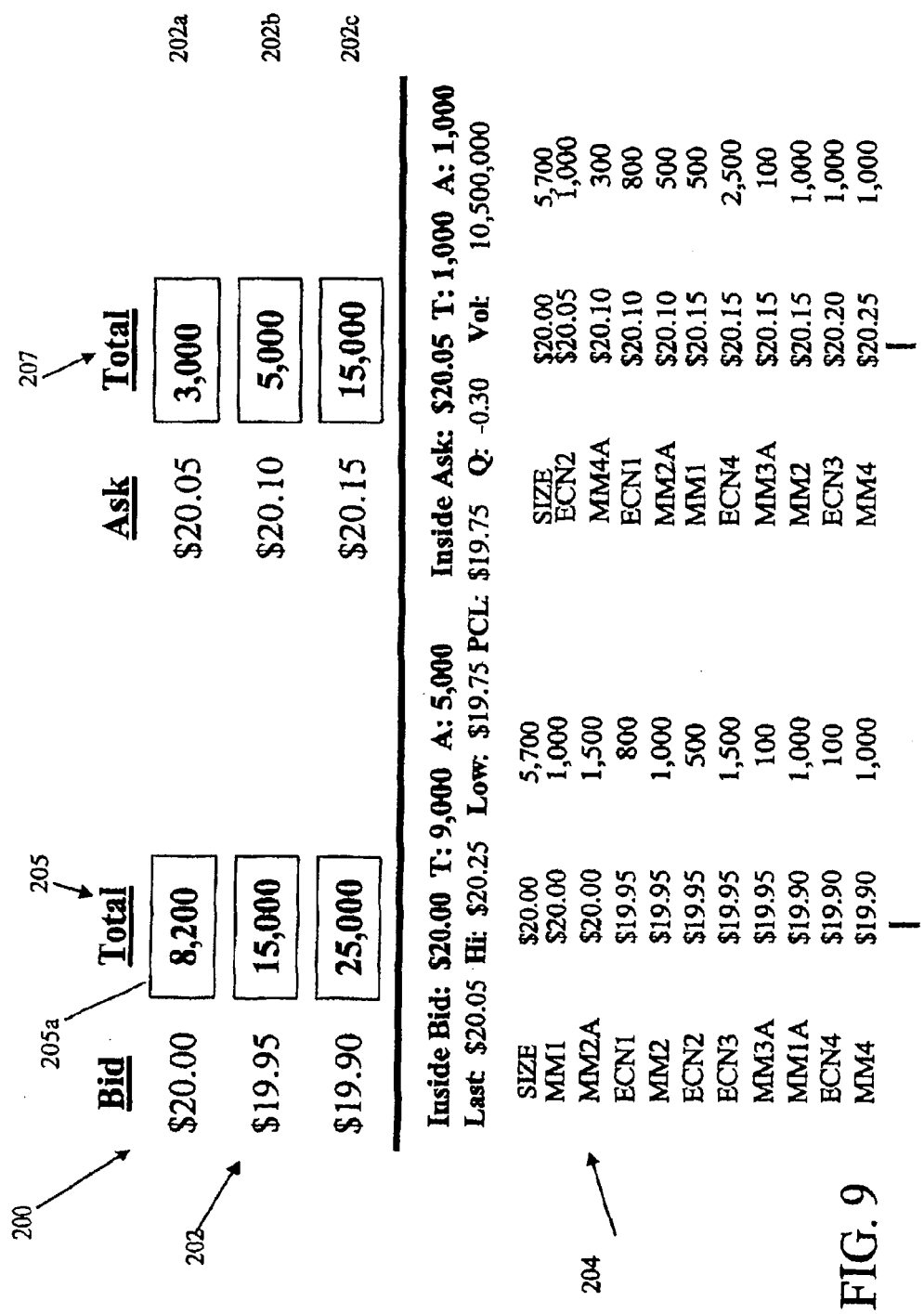
FIG. 9 is a diagram that depicts aspects of a composite montage.

The current quote montage 204 of the window 200 without agency quotes is similar to the long existing Nasdaq display montage, whereas the current quote montage 204 with the agency quotes as depicted in FIG. 9 is similar to that shown in U.S. patent application Ser. No. 09/208,942, filed on Dec. 12, 1998 entitled "DUAL QUOTE MARKET SYSTEM" (now U.S. Pat. No. 7,599,875) by Richard G. Ketchum et al. and assigned in part to the assignee of the present invention.

A broker/dealer can receive an order from a customer. The broker/dealer can send that order to the order collector facility 20 to be executed with quotes that are posted by electronic communication networks, market makers or other markets. In this embodiment, orders of broker/dealers are not posted as quotes.

Order Collector Facility

Figure 2A:
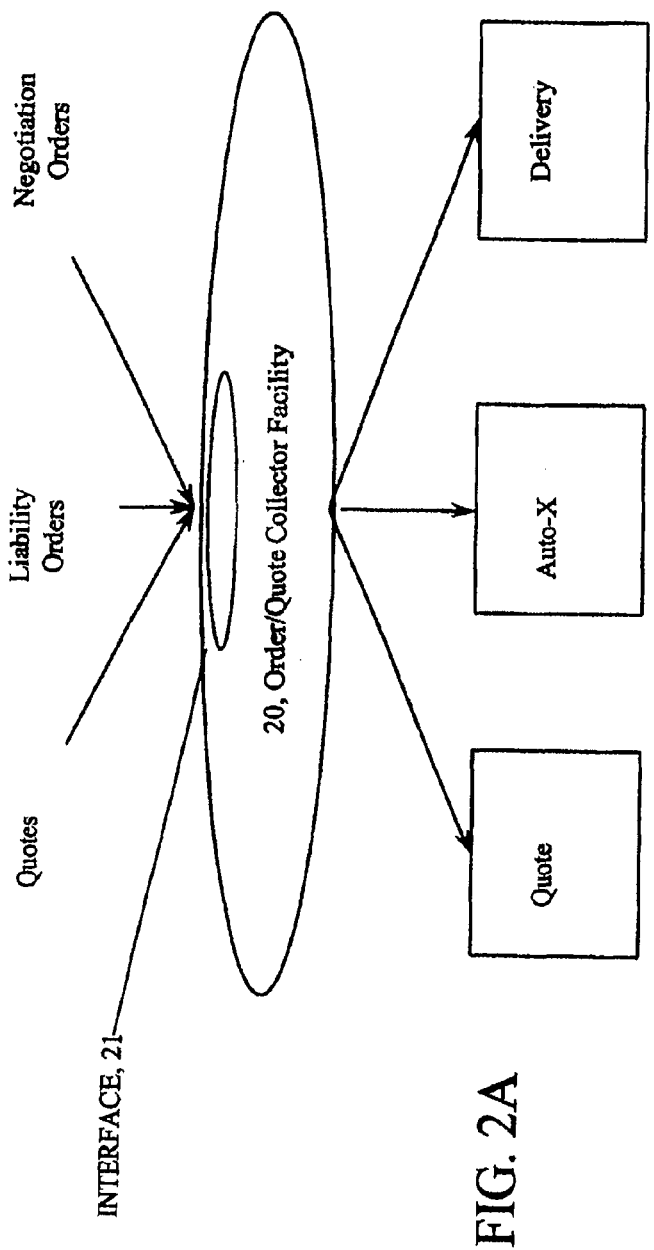
FIG. 2A is a block diagram showing arrangement of an quote/order collector facility.

Referring to FIG. 2A, the quote/order collector facility 20 receives quotes, liability orders, (non-liability orders) and directed orders from market participants. The quote/order collector facility 20 allows a quote/order to be displayed in the market, and also allows for marketable orders to be executed or routed to market participants.

The order quote collector facility 20 also includes an interface 21 that couples the order collector facility 20 to a plurality of order delivery systems. For example, the interface 21 can couple the order quote collector facility 20 to an order execution system, e.g., the Small Order Execution System® (SOES®) and to a negotiation system, e.g. SelectNet®. The interface 21 would provide access to information contained in order flow delivered via the delivery systems to a quote/order collection process 25 described in conjunction with FIG. 2B. In general, the electrical and logical functions which comprise the interface 21 can be similar to the ones currently existing in the SOES®/SelectNet® systems. The interface 21 or the process 25 would extract information from the quotes and make that information available to the quote order collector process 25. The quote/order collector process 25 extracts information and process orders in a unified manner to allow the order collector facility 20 to be a unifying point of collection of all orders which are sent to the market 10.

The interface 21 can also be used to route executions of liability orders back to market participants whose quotes/orders were executed against and can deliver orders for negotiation against market participants whose quotes are selected for further negotiation via the SOES$^{SM}$ and SelectNet® systems.

Figure 2B:
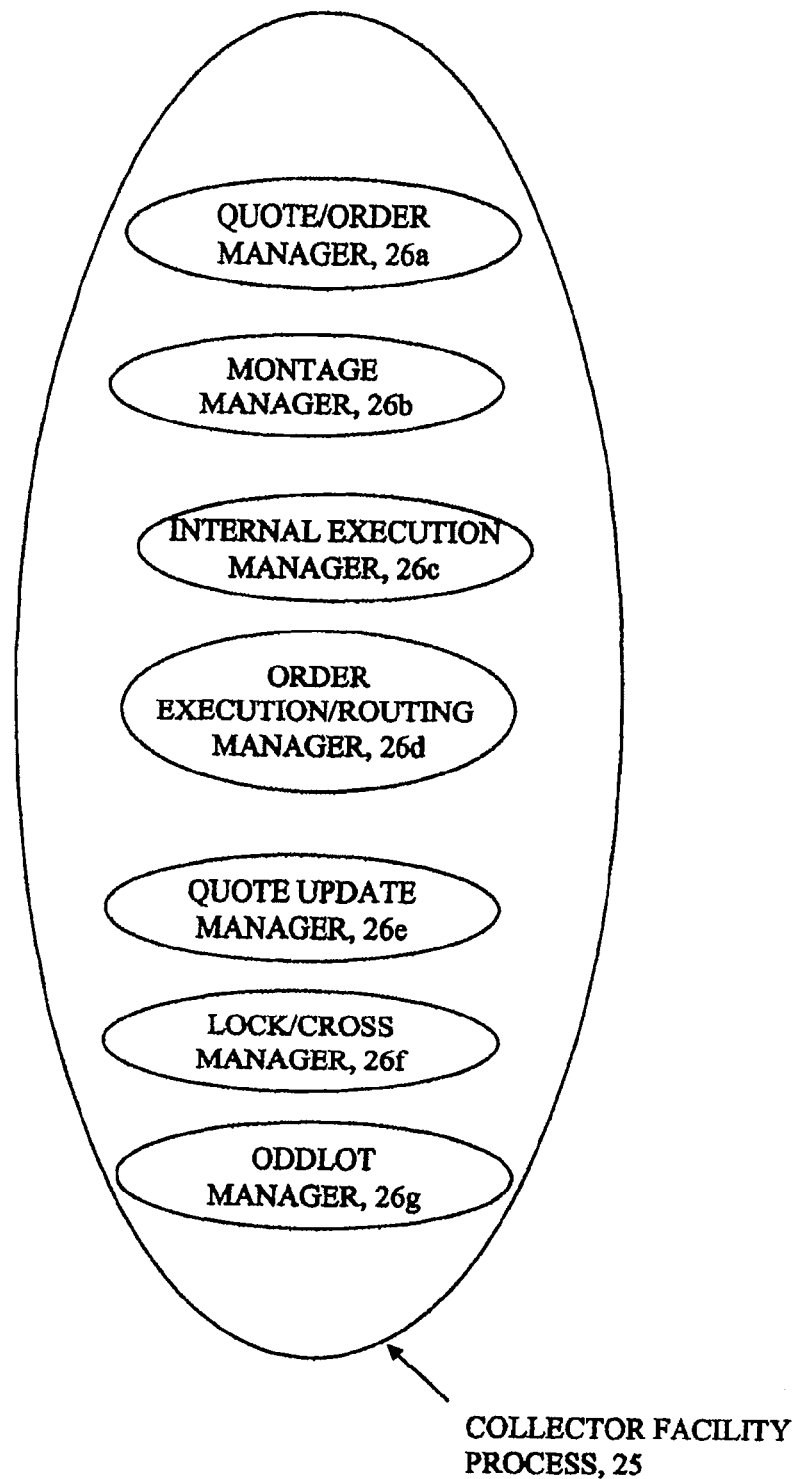
FIG. 2B is a logic view of functions in the quote/order collector facility.

Referring to FIG. 2B, the quote/order collector process ("OCP") 25 is shown. The quote/order collector process 25 provides transmission of multiple orders or quotes at multiple price levels by Quoting Market Participants to a quotation manager 26a. The quote/order manager 26a that provides a unified point of entry of quotes and orders from disparate delivery systems into the quote/order collector facility 20 to access quotes/orders displayed (as either attributable or non-attributable) in both the aggregate montage and current quote montage. The quote/order manager 26a manages multiple quotes/orders and quotes/orders at multiple price levels and uses a montage manager 26b to display (either in the Aggregate montage or in the current quote montage) the orders/quotes consistent with an order's/quote's parameters. The order collector process 25 also includes an internal execution process manager 26c to match off executions for quoting market participants at the best bid/offer. The order collector system 20 also includes an order routing/execution manager 26d provides a single point delivery of executions or routing of orders, which substantially eliminates potential for dual liability. That is, order collector process 25 will maintain the order routing and executions functionality available in the SOES® and SelectNet® systems. The order collector process 25 also includes a quote update manager 26e, a lock/cross manager 26f, and an odd lot execution manager 26g.

Figure 3A:
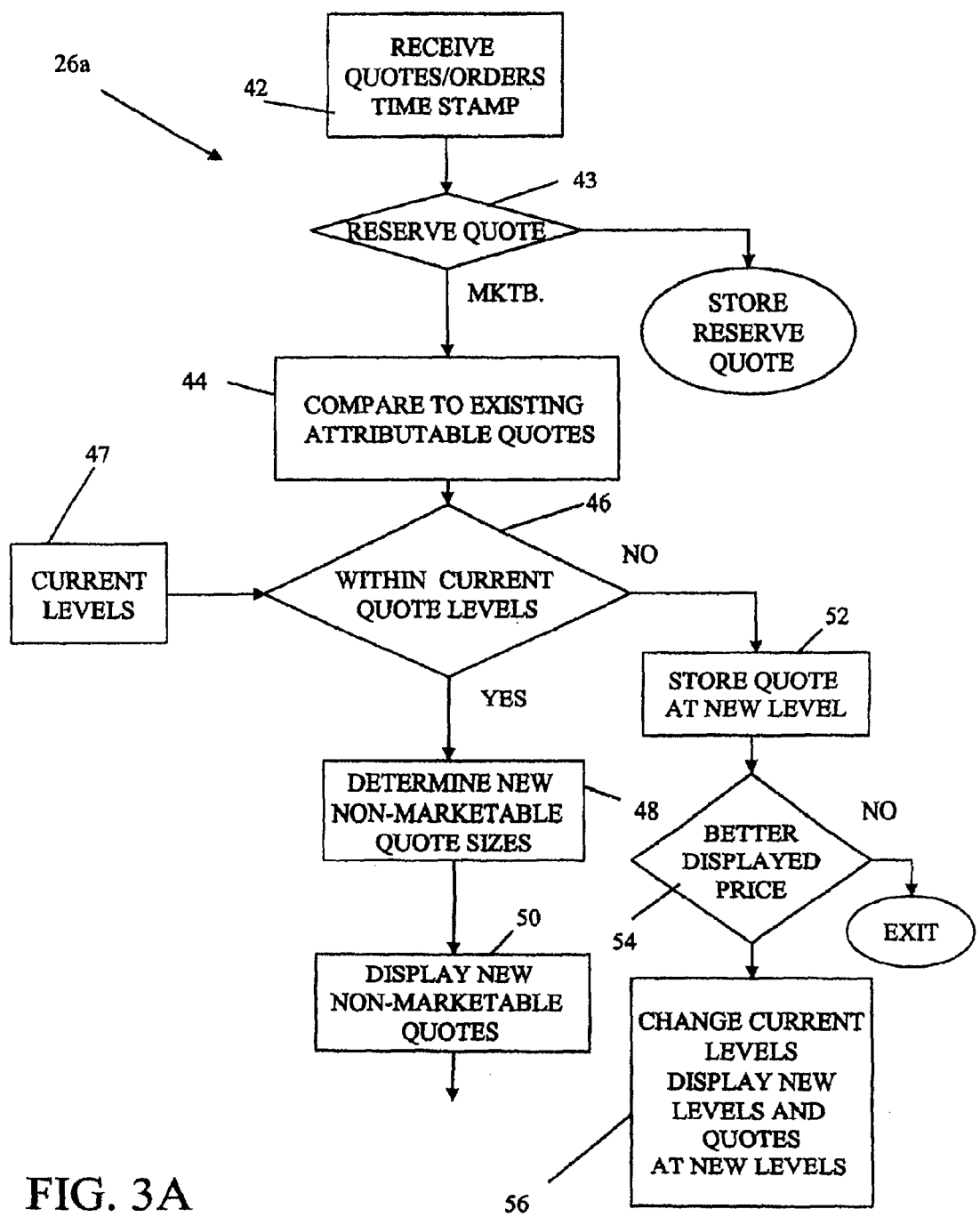
FIG. 3A is a flow chart showing a quote/order manager.

Referring to FIG. 3A, the order collector process 25 receives orders/quotes and time stamps 42 each order/quote upon receipt. This time stamp determines the order's/quote's ranking for automated execution. Quotes/orders are designated as either attributable or non-attributable, and could also have a reserve size discussed above. The order collector process 25 aggregates all of a Quoting Market Participant's attributable and non-attributable orders at a particular price level, and disseminates order/quotation information into the aggregate montage and/or the current quote montage, as will be discussed below.

The order entry process 25 determines 43 whether the received quote/order corresponds to a reserve quote. If the quote does not corresponds to a reserve quote then the quote is a displayable quote that is attributable or non-attributable. The order entry process 25 compares 44 the received quotes/ orders to existing quotes/orders to determine 46 whether the price of quotes/orders fall in existing quote/order price levels 47. Any number of quote/order price levels can be accommodated although in this example, only three price levels will be displayable in the non-attributable i.e., aggregate montage. If the quote price is in a displayable price level it is a displayable quote eligible for automated execution. The order collector system 20 can be provided with more price level depth than the three levels, e.g., a depth of 20-25 levels although only a limited number, e.g., three would be displayed at any one time.

If the quote is within one of the pre-defined quote levels, the process 25 determines 48 new non-marketable quote/orders sizes by adding the quote/order size corresponding to the received quote/order to quote sizes at that price level already in the system 20. The process 25 will cause the new non-marketable quote sizes to be displayed 50. If the quote is not within one of the pre-defined quote levels, the process 25 stores 52 the quote at a new price level determines 54 if it is at a better price. If the quote is at a better price, the process 25 changes 56 current levels to cause a new price level for non-marketable quote sizes to be displayed 50.

Figure 3B:
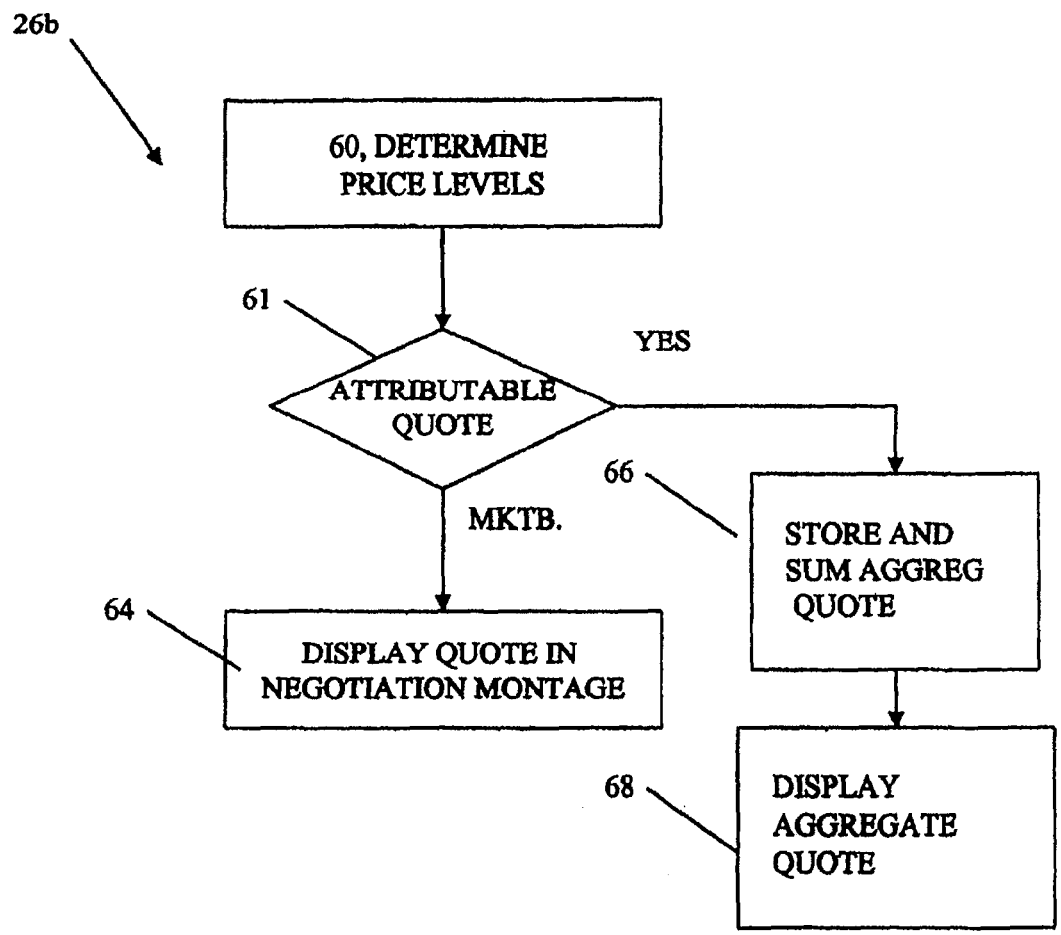
FIG. 3B is a flow chart showing a montage manager.

Referring to FIG. 3B, the montage manager 26b of the quote/order collector process 25 determines 60 which price levels to display 60 and determines 61 if an order is a non-attributable order. If the order is non-attributable, the quote/order collector process 25 will store and sum 66 the quote with like quotes to produce an aggregated quote and display 68 the aggregate size of such orders in the aggregate montage when the orders fall within one of the three top price levels. For attributable orders, the aggregate size of such orders is displayed in the current quote montage once the order(s) at a particular price level becomes the particular quoting market participant's best attributable bid or offer in the current quote montage. This interest will also be aggregated and included in the aggregate montage if it is within the displayed price levels. Market makers and ECNs can have one MMID and possibly an agency MMID against which they can display attributable quotes. If a market maker has an agency quote, attributable orders will be displayed once the order or orders at a particular price level become the market participant's best agency quote.

For example, MMA sends system 20 five 1,000 shares attributable buy orders at $20 and two 1,000 share non-attributable buy orders at $20, for a total interest of 7,000 shares to buy at $20. At some point, the $20 price level becomes the best bid. In this example, if MMA is alone at the inside bid, system 20 will aggregate all of the orders in the system and display as follows: 7,000 shares in the Aggregate montage; 5,000 shares (the attributable portion) in the current quote montage next to MMA's MMID; and 2,000 (the non-attributable portion) in a "SIZE" MMID.

Quote/order collector system 20 provides several advantages to the market. One advantage is that it ensures compliance with the regulatory rules such as the SEC Order Handling Rules, and in particular the Limit Order Display Rule and SEC Firm Quote Rule. With system 20 it is less likely that a Quoting Market Participant, because of system delays and or/fast moving markets, will miss a market because the Quoting Market Participant is unable to quickly transmit to System 20 a revised quote (which may represent a limit order).

ECNs do not currently participate in the $SOES^{SM}$ execution system because of the potential for dual liability and assuming proprietary positions. For example, if an ECN matches orders between two subscribers and contemporaneously receives an execution from $SOES^{SM}$ against its quote, the ECN will be required to honor both the internal execution and the $SOES^{SM}$ execution, thus taking on a proprietary position. This issue of liability does not arise in SelectNet® because that system delivers orders which can be declined if the ECN, after scanning its book, determines that the quote was taken out by an internal execution. An ECN cannot decline a $SOES^{SM}$ execution because the system delivers an execution, as opposed to an order.

An ECN, like a market maker, can have the ability to give orders to the system 20. If an internal subscriber wants to access an order in an ECN that is also being displayed in system 20, the ECN can request a cancel before effecting the internal match, as discussed below in FIG. 4. If the request to cancel is declined because the order was already executed against in system 20, the ECN can decline the internal customer and avoid the potential for dual liability.

Figure 4:
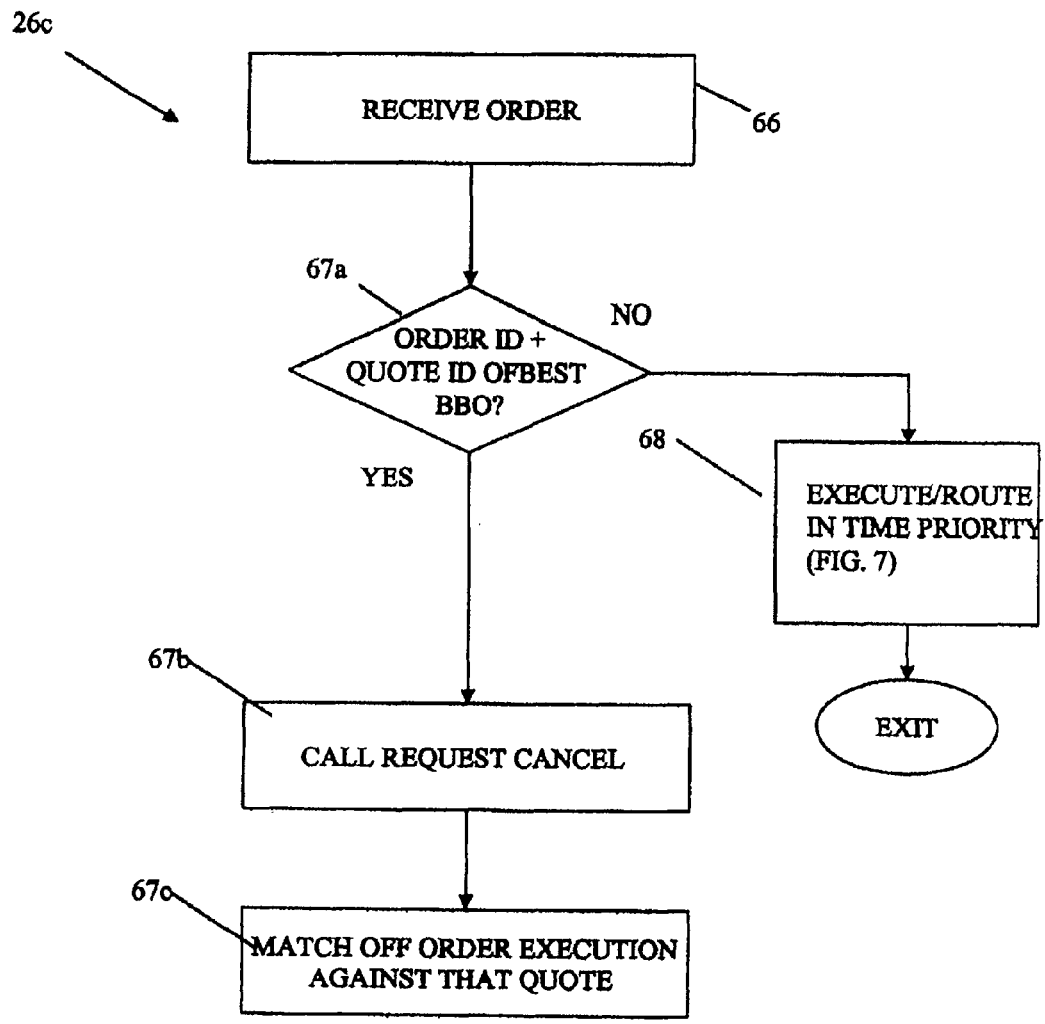
FIG. 4 is a flow chart showing an internal execution manager.

Referring now to FIG. 4, the internalize execution manager 26c is shown. Another benefit of the system 20 is that when Quoting Market Participant is at the best bid/best offer, internalize execution manager 26c matches-off a participant's agency or proprietary orders against that participant's quotes/order before the order is sent for time/price priority execution in the quote/order collector facility 20. Quoting Market Participants encounter difficulties in managing their book because Quoting Market Participants may transmit only a single quote (which may represent a single order or an aggregate of proprietary/agency interest at a single price).

For example, if MMA sends system 20 all of its quotes/orders and is at the best bid of $20 showing 4,000 shares (attributable and non-attributable), and the MMA sends OCP 25 a 1,000 share market sell order from one its customers, OCP 25 will examine 67a the identification of the order and if it matches the identification of the market participant who is at the best bid or offer for that security, the OCP 25 will execute 67b the order against the participant's own quote, thus matching off the order on behalf of the participant. The OCP 25 can call 67c a "request a cancel" function where a Quoting Market Participant can request cancellation of an order from system 20 before the order is actually executed. The request to cancel feature, along with the ability to leave orders with OCF 20, will benefit ECNs by allowing them to participate in automatic execution and the internalized execution process 67 described above while minimizing the potential for double liability or taking on a proprietary position.

Currently, to access quotes via automatic execution, a market participant may enter an order into its $SOES^{SM}$ system if the order is for a public customer and meets maximum order size requirements. A market participant may use SelectNet® if an order is not $SOES^{SM}$ eligible, if the market participant wishes to access a quote of an ECN or UTP Exchange, or if the market participant wishes to use the negotiation features of SelectNet®. However, $SOES^{SM}$ and SelectNet® are not integrated and operate in an asynchronous manner.

In a preferred embodiment of the order collector facility 20, the SelectNet® system is used as a negotiation system and specific changes are made to the $SOES^{SM}$ system. The two systems can continue to operate on separate platforms. From an end-user's perspective, a market participant will still have to operate and manage two separate systems. For example, market participants will have to first determine the type of order they wish to enter (liability v. non-liability) and/or to whom they wish to send the order (market maker, ECN, UTP Exchange), and then decide which system ($SOES^{SM}$ or SelectNet®) to use to enter the order.

SOES® and SelectNet® are configured to minimize the potential for dual liability, as described in copending patent application Ser. No. 09/404,517 filed Sep. 23, 1999 entitled DELIVERY SYSTEM FOR ORDERS IN AN ELECTRON MARKET (abandoned) which is incorporated herein by reference. In that application, to minimize the potential for dual liability (e.g., receipt of a Liability Order followed immediately by the delivery of an execution against a market maker's quote), the SelectNet® system is configured so that only a non-Liability Order could be delivered to those market participants who participate and are subject to automatic execution. To send a Liability Order to a market maker, a market participant would use the system to route the order to the next market maker in a queue. Market participants would still use SelectNet® to access quotes of ECNs that do not participate in SOES$^{SM}$ and to direct non-Liability Orders to a particular market maker. The SOES system is also reconfigured to an automated facility for the handling of all market traded orders of less than a predetermined number of shares, e.g., 9,900 shares. The orders can be entered for execution against an expanded trading interest accessible through both displayed (and reserve size quotes described below).

The OCF 20 will eliminate virtually all potential for double liability using the disparate delivery systems because OCF 20 will serve as the single point of order entry and the single point of delivery of all Liability Orders (as well as Non-Liability Orders)

To access quotes in system 20, therefore, order entry firms, market makers, ECNs, or UTP Exchanges, will enter either a directed or non-directed order into the OCF 25. The order may be of any size. The order indicates whether it is a buy, sell, sell short, or sell short exempt. The order is either a priced order or a market order. The system 20 has a separate odd lot process described below.

Nondirected Orders

A market participant can immediately access the best prices in system 20 as displayed in the aggregate montage, by entering a non-directed order into the OCF 25. A non-directed order, is an order that is not sent/routed to a particular Quoting Market Participant. A non-directed order is designated as a market order or a marketable limit order and is considered a "Liability Order" and treated as such by the receiving market participant. If a non-directed limit order is marketable when entered into the system but subsequently becomes non-marketable because of a change in the inside market, the system will hold the order for e.g., 90 seconds and not immediately return the order to the participant. If within the 90 seconds the order once again becomes marketable, the system will send the order to the next Quoting Market Participant in queue. Additionally, the order entry participant can obtain the status of the order and request a cancel of such order.

Upon entry, the OCF 25 will ascertain what market participant is the next Quoting Market Participant in queue to receive an order, and depending on how that receiving Quoting Market Participant participates in system 20 (i.e., automatic execution v. order delivery), the OCF 25 will either cause delivery of an execution (via SOES$^{SM}$) or delivery of a Liability Order (via SelectNet®).

For example, if MMA and ECN1 (non-automatic exception participant) are at the inside bid each displaying 1,000 shares at $20, and OE Firm A enters a market order to buy 1,000 shares, assuming that MMA is first in time priority, the OCF 25 will route the order into the SOES$^{SM}$ and deliver an execution of 1,000 shares to MMA via the SOES$^{SM}$. If another market order to buy 1,000 shares is entered into the system, the OCF 25 will deliver an Liability Order to ECN1. If ECN1 had opted to take automatic execution, the OCF would had delivered an execution to ECN1 via the SOES$^{SM}$.

Order Execution Manager

Figure 5A:
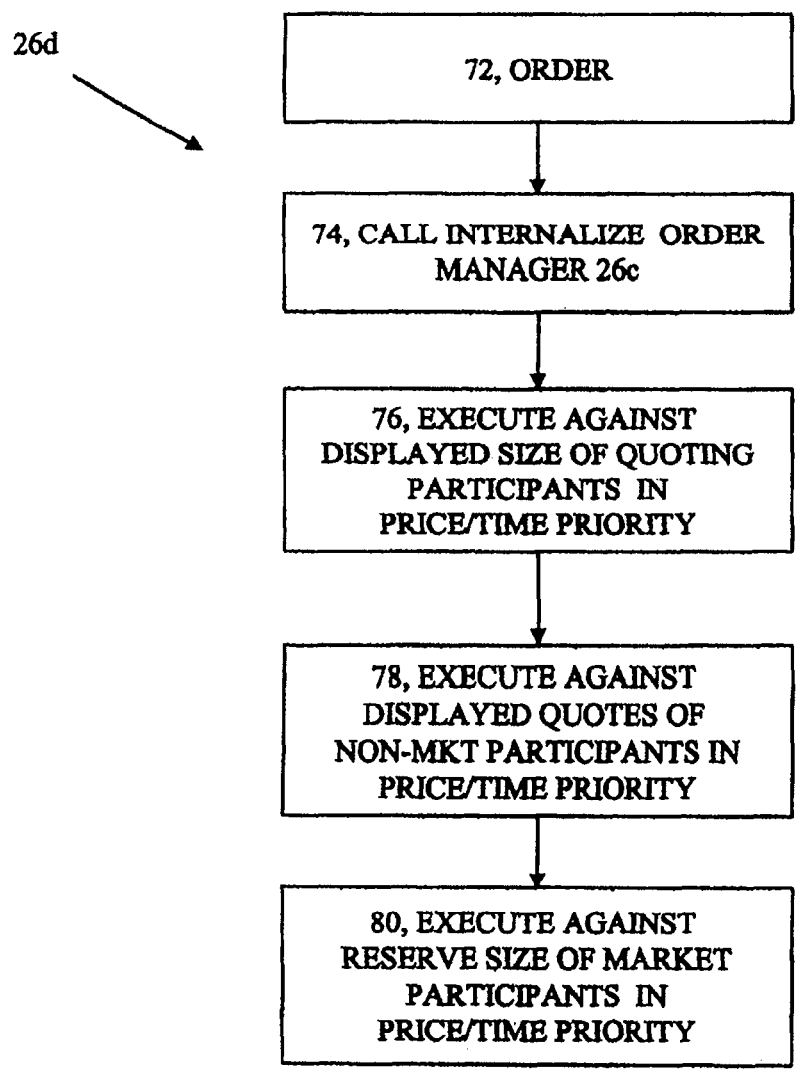
FIGS. 5A-5B are flow charts of an execution/routing manager.
Figure 5B:
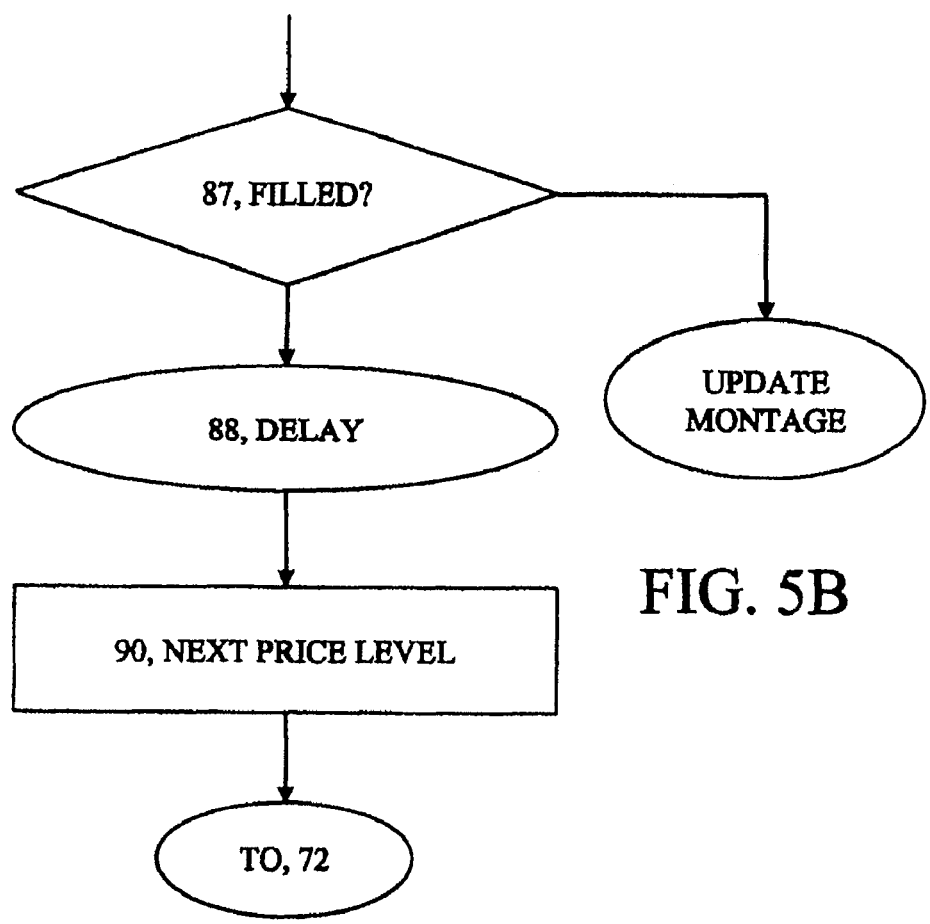

Referring to FIGS. 5A-5B, the order execution/routing manager 26d is shown. The order execution/routing manager 26d will execute non-directed orders against Quoting Market Participant's quotes/orders based on price/time priority. As noted above, each quote/order when entered into the OCF 25 receives a time stamp. The order execution/routing manager 26d will deliver all orders at the best bid/best offer in strict time priority based on the time stamp of the order/quote, with the exception that order execution/routing manager 26d will first attempt to provide a match off of orders/quotes entered by a Quoting Market Participant if the participant is at the best bid/best offer by calling the internal execution manager 26c (FIG. 4). Thus, the order execution/routing manager 26d will call the internal order execution manager 26c to try to match off a Quoting Market Participant's orders and quotes that are in the system if the participant is at the BBO and receives a market or marketable limit order on the other size of the market.

The order execution/routing manager 26d will attempt to execute 76 against all displayed size (attributable and non-attributable) at a particular price level for market participants such as market makers and ECN's. There does not need to be an interval delay between the delivery of executions against a market maker's quote (assuming the market maker has size to access) because all Quoting Market Participants may quote their actual size and may give multiple orders and price levels. As shown herein the market maker proprietary orders receive preference over agency orders. However, preference could be given to agency orders before market maker orders.

Once displayed size in system 20 is exhausted, the order execution/routing manager 26d will attempt to access the quotes of UTP Exchanges. After accessing the displayed size of Quoting Market Participants and UTP Exchanges 78, order execution/routing manager 26d will attempt to execute against the reserve size of Quoting Market Participants in price/time priority.

In an alternate embodiment, the order execution/routing manager 26d can distinguish between exchanges that support auto execution and exchanges that do not support auto execution giving preference for the former. Additionally, in such an embodiment, UTP exchanges can have reserve size and the system 20 can distinguish between exchanges that support auto execution and those ECN's, and then exchanges that do not support auto execution.

In another embodiment the order execution/routing manager 26d can first access quotes of market makers and auto-execution ECN's, next access quotes of market makers and ECN's for delivery of orders, then the reserve size of market makers and ECN's and UTP exchanges.

Referring to FIG. 5B, if the order is not filled 88, the order execution/routing manager 26d will move 90 to the next price level, after a predefined delay, e.g., a 5 second interval delay 87 before attempting to execute an order at the new price level. The price-level interval delay will give market participants time to adjust their quotes and trading interests before the market moves precipitously through multiple price levels, which may occur when there is news, rumors, or significant market events. Thus, the price-level interval delay is a modest and reasonable attempt to limit volatility.

Directed Orders

The current quote montage allows Quoting Market Participants to advertise their buying or selling interest. To access a specific quote in the current quote montage, a market participant will enter into the OCF 25 a "directed order" to begin the negotiation process with a particular Quoting Market Participant. A directed order is one that is routed by the market participant entering the order to a specific MMID. To limit the possibility for dual liability, a directed order must be designated as: 1) All-or-None ("AON") and at least 100 shares greater than the size of the displayed quote of the market participant to which the quote is directed; or 2) a Minimum Acceptable Quantity order ("MAQ") with an MAQ value of at least 100 shares greater than the displayed amount of the quote of the participant to which the order is directed. If a Quoting Market Participant is at the inside or displaying (attributable or non-attributable) interest in the montage and receives a directed, non-Liability Order that the participant wishes to fill, to avoid double liability the Quoting Market Participant may "request a cancel" of its displayed quote/order in System 20 before it fills the non-Liability Order. System 20 will not decrement a quote upon the delivery of a non-Liability Order.

Figure 6:
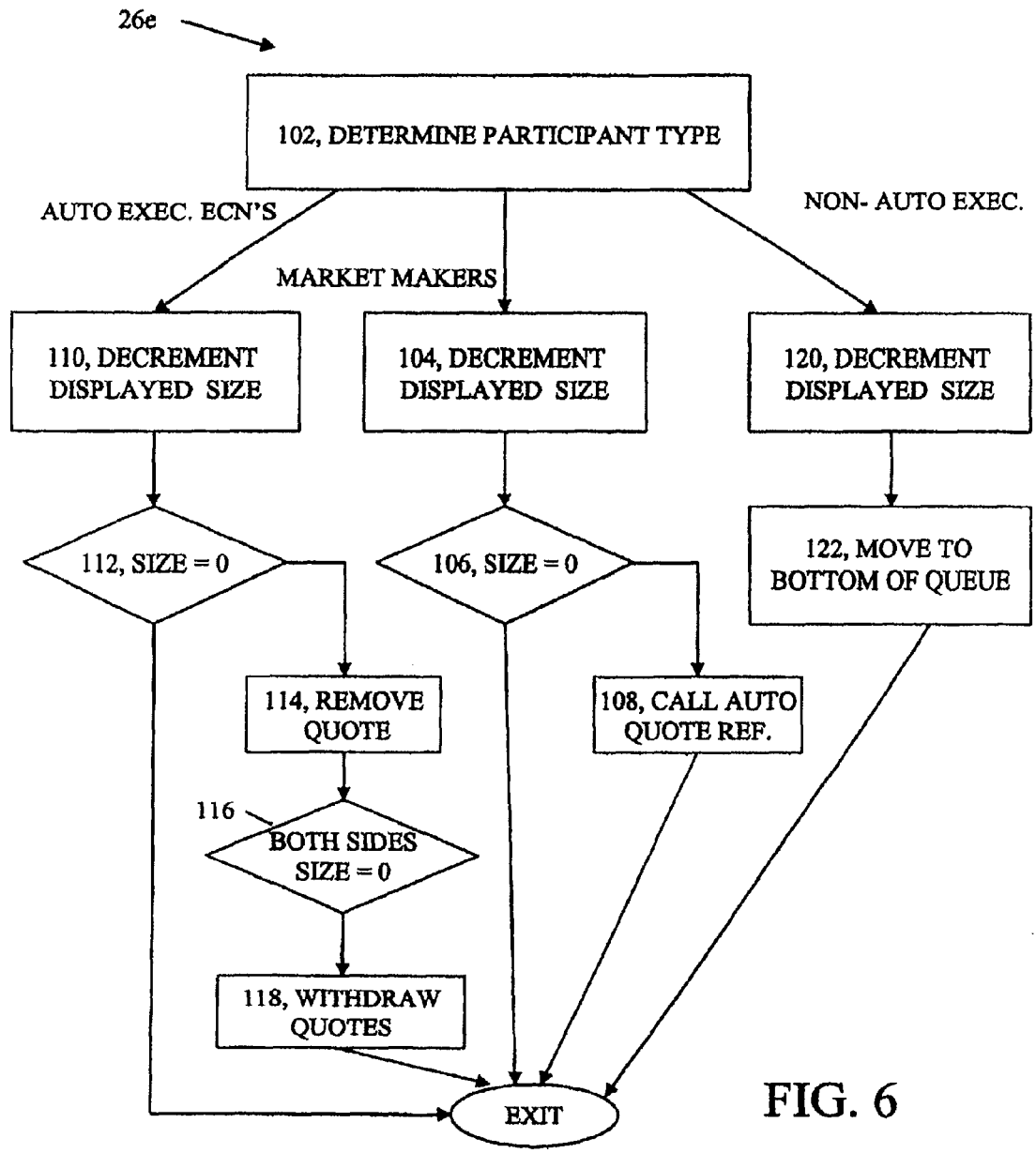
FIG. 6 is a flow chart showing a quote montage update manager.

Referring to FIG. 6, a quote update process in the quote size manager 26e is shown. If an execution is delivered to a Quoting Market Participant that accepts automatic executions 102 (i.e., market makers or ECNs that choose to accept automatic executions via the SOES$^{SM}$), quote size manager 26e will automatically decrement 104 the aggregate quote in the aggregate montage by the size of the incoming order, and the Quoting Market Participant's quote in the current quote montage if the quote/order is attributable. For Quoting Market Participants who accept automatic execution, if the participant's displayed size is decremented to zero 106, the Quoting Market Participant's displayed (attributable or non-attributable) size will be replenished from reserve if the market participant has reserve size by calling 108 an auto quote refresh.

If an ECN accepts automatic execution via SOES$^{SM}$ and has its quote exhausted to zero 111 without update or without transmission of another attributable quote/order, quote size manager 26e will zero out 114 the one side of the quote that is exhausted. If both the bid and offer size of the ECNs market is reduced to zero without update or transmission of another attributable quote/order, the ECN will be placed into an excused withdrawal 116 and restored once the ECN transmits revised quotes.

For Quoting Market Participants that do not participate in automated execution, e.g., ECNs that opt out of automatic execution and UTP Exchanges that only participate in order delivery, the execution manager 26d will deliver a Liability Order of a size that is equal to or less than the participant's quoted size. System 20 will automatically decrement 120 the participant's 122 quote by the size of the order delivered, but quote size manager 26e will move the participant to the bottom of the queue and not deliver another order to such Quoting Market Participant until the Quoting Market Participant has processed the order by providing a complete or partial fill of the order. If such Quoting Market Participant declines or partially fills the order, System 20 will send the order (or remaining portion thereof) back into the queue for delivery to the next available Quoting Market Participant. In addition, if the Quoting Market Participant declines or partially fills the order, or if the participant fails to respond in any manner within 10 seconds of order delivery, System 20 will presume equipment failure and will take corrective action.

For ECN's, quote size manager 26e will zero out that side of the ECN's market, and for UTP Exchanges quote size manager 26e will place the participant at the lowest bid and highest offer price for a trading unit e.g., 100 shares until updated. This is necessary to ensure that Quoting Market Participants that do not provide timely executions due to equipment or other failures do not hold up the market and cause queuing of orders within the system 20. As noted previously, market makers will be required to maintain a two sided, attributable proprietary quote (other than its Agency Quote) in system 20 at all time. To assist with this requirement, market makers will be able to use the AutoQuote Refresh ("AQR") process that is available in the SOES$^{SM}$.

When a market maker's proprietary quote (both displayed and reserve) is exhausted to zero, the system will refresh the market maker's price on the bid or offer side of the market, whichever is decremented to zero, by an interval designated by the market maker and the market makers size to a level designated by the market maker. When the market maker's quote is refreshed, however, the AQR will refresh the market maker's attributable quote/order (not the non-attributable quote). AQR will not be available for Agency Quotes. Additionally, if a market maker does not use AQR but otherwise has another attributable proprietary quote in System 20, System 20 will automatically display the market maker's next best attributable proprietary quote when its current attributable quote is exhausted.

If a market maker's quote is decremented to zero and does not update its non-agency quote via AQR, transmit a revised attributable quote to System 20, or have another proprietary attributable quote/order in System 20, System 20 will place the market maker's quote (both sides) in a closed state for a short period of time, e.g., three minutes. At the end of that time period, if the market maker has not on its own updated its quote or voluntarily withdrawn its quote from the market, System 20 will refresh the market maker's quotation to 100 shares at the lowest market maker bid and highest market maker offer currently being displayed in that security and reopen the market maker's quotation.

Locked/Crossed Markets

Figure 7:
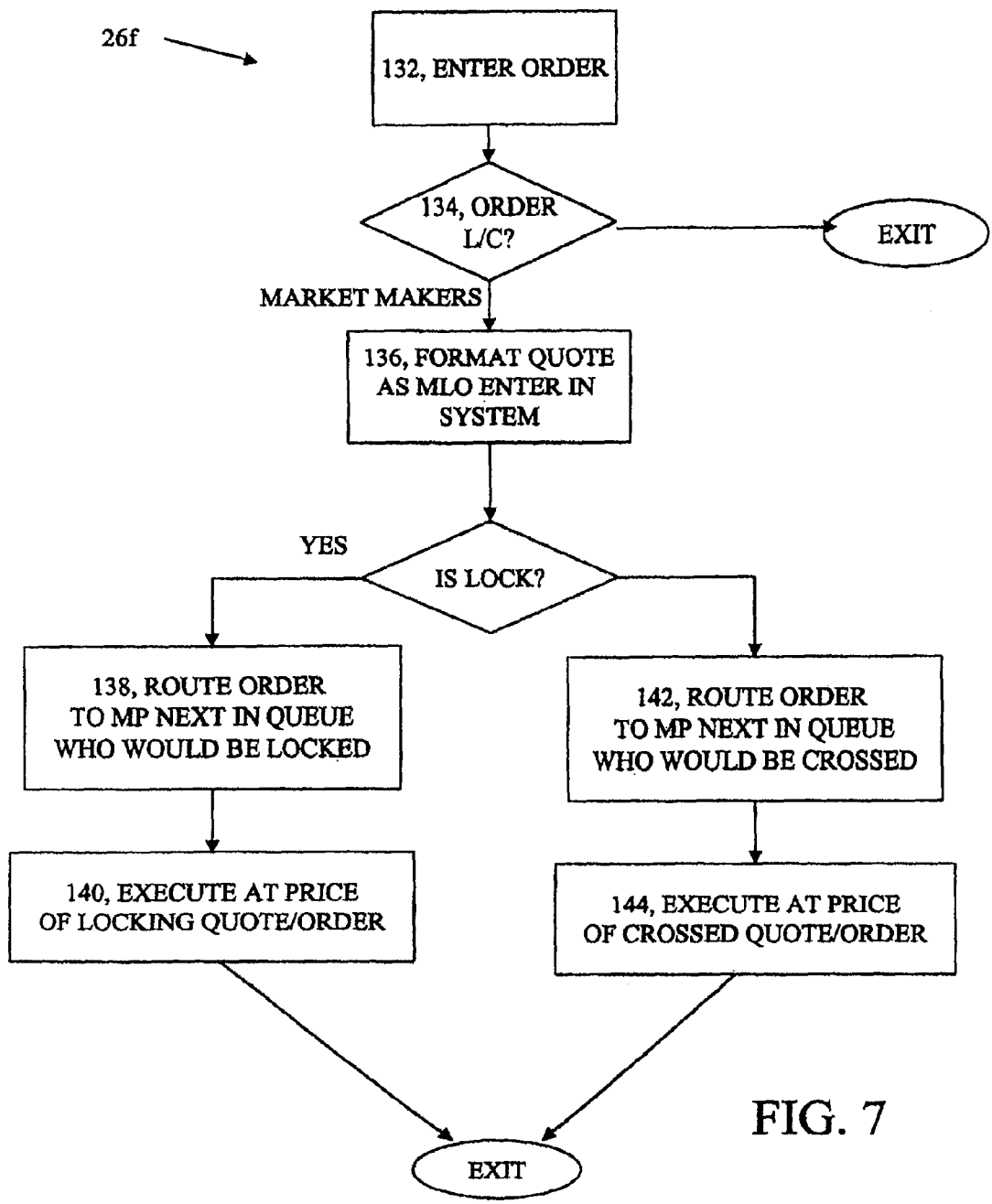
FIG. 7 is a flow chart showing a lock/cross manager.

Referring to FIG. 7, a lock/cross manager 26f is shown. With the lock/cross manager 26f, locked and crossed markets, can be virtually eliminated. Specifically, if a Quoting Market Participant enters a quote 132 that would lock or cross the market 134, the lock/cross manager 26f will not display the quote as a quote, but instead the lock/cross manager 26f will format the quote and treat it as a marketable limit order 136 and enter the reformatted order into the OCF 25 as a non-directed Liability Order for execution in time priority. In a locked market situation 137, the orders will be routed 138 to the Quoting Market Participant(s) next in queue whom would be locked, and the order will be executed 140 at the price of the locking quotes/orders. For crossed market situations 137, the crossing order will be entered 142 into the system and routed to the next Quoting Market Participants in queue, and the order will be executed at the price of the displayed quote that would have been crossed. Once the lock/cross is cleared, if the Quoting Market Participant's order is not completely filled 146, the lock/cross manager 26f will reformat the remainder of the order and cause it to be displayed 148 as a quote on behalf of the entering Quoting Market Participants. If the market moves and the order no longer is locking/crossing, the lock/cross manager 26f will return the order and format it as a quote for display in System 20.

For example, the inside market is $20 bid, $20$\frac{1}{16}$ offer, bid size 1,000 by 1,000 offer, and MMA is at the inside bid. If MMC attempts to enter into the system an offer quote of $20 for 4,000 shares, the OCF 25 will format MMC's quote as an order, route it to MMA (assuming MMA is first in queue and there are no other marketable orders in queue ahead of MMC's quote/order), and execute MMC's order against MMA's quote at $20 for 1,000 shares. If the next market participant on the bid side is quoting at $19$\frac{15}{16}$ and since there are 3,000 shares remaining in MMC's order, the OCF will reformat the remaining portion of the order and display it as a quote (consistent with the order's parameters), thereby establishing a new inside of $19 15/16 bid and $20 offer.

As a second example, if MMC attempts to enter into the system an offer quote of $19 15/16 for 1,000 shares when MMA is at the best bid of $20, the system will format MMC's quote as an order, route it to MMA, and execute MMC's order against MMA's quote a $20, 1,000 shares, thus giving price improvement to MMC's order.

If the market is locked or crossed at the opening, system 20 will attempt to clear out the locked and/or crossed quotes, and then will begin processing market and marketable limit orders that are in queue.

UTP Exchange Participation

National securities exchanges trading pursuant to grants of unlisted trading privilege ("UTP") can enter orders into the OCF 20. UTP Exchanges will receive, and be obligated to execute, Liability Orders or may provide auto execution to incoming orders if they so choose. Specifically, when a UTP Exchange is next in queue to receive a Liability Order, System 20 will deliver a non-directed order to the UTP Exchange.

Additionally, if a UTP Exchange wishes to access the best market, the UTP Exchange may enter a non-directed Liability Order into the OCF. The OCF will send the next market participant an order for delivery, not automatic execution, regardless of whether the Quoting Market Participant participates in automatic execution. This is similar to the manner in which NASD market makers in the third market are accessed and may access other market centers. UTP Exchanges will also be able to direct non-Liability Orders for negotiation to particular market makers. Finally, UTP Exchanges will only be able to submit attributable quotes, and will not be able to utilize reserve size or AQR.

ECN Participation

ECNs will have the choice of taking order deliver or participating in automatic execution. Regardless, ECNs in System 20 will have full access to the OCF 25 for order entry and order delivery and will be able to designate orders/quotes as attributable/non-attributable, have a reserve size, and be able to transmit multiple quotes/orders at multiple prices.

Odd-Lot Processing

Figure 8:
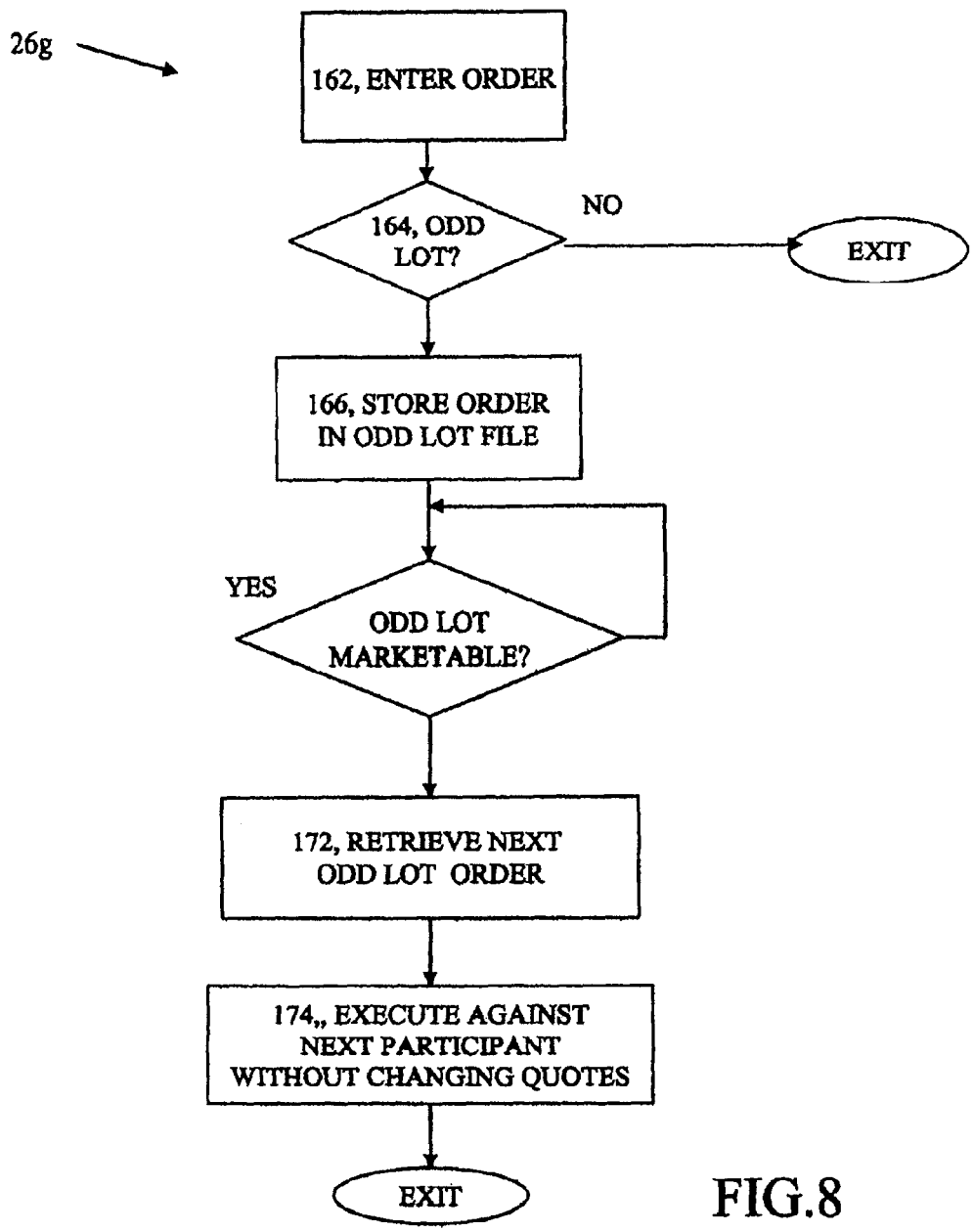
FIG. 8 is a flow chart showing an odd lot execution manager.

Referring to FIG. 8, an odd lot execution manager 26g is shown. The odd lot execution manager 26g will accept and execute orders less than one normal unit of trading, i.e., odd-lot orders or orders less than one round lot (i.e., 100 shares for equities). The odd lot execution manager 26g is a separate mechanism for processing and executing these orders as distinct from normal units of trading. Odd lot execution manager 26g will detect 164 and hold 166 odd-lot orders in a separate file and automatically execute 170 such odd-lots against market makers 177 in round robin rotation whenever the odd-lot order becomes marketable, i.e., when the best price in the system moves to the price of the odd-lot limit order. For example, if a member enters a market order for 50 shares into the system, odd lot execution manager 26g will immediately and automatically execute the order at the inside price against the market maker that is first in rotation for execution of such orders, regardless of the market maker's quoted price. The odd lot execution manager 26g will not decrease the market maker's displayed size. Additionally, if a mixed lot is entered into the system, to ensure continuity of price, once the round-lot portion is executed, the odd-lot portion will be executed against the next market maker in rotation at the round-lot portion price.

Small Capitalize Stocks

The system 20 could use the expanded SOES$^{SM}$ system and the aggregation montage for all securities, including Small Capitalize Stocks (SmallCap). This would eliminate the need to have separate systems for those listed securities.

Montage

Referring to FIG. 9, the system uses a composite montage 200. One component of the composite montage is the current montage 204 that exists in the current NWII presentation. The current montage 204 has into two primary display components. One component 205 is the Market Minder Window, which allows market participants to monitor price activity (inside bid/offer and last sale) of selected stocks, and the Dynamic Quote window, which shows for a particular stock the inside bid and offer, the last sale, change in price from previous close, daily high and low, volume, and the short sale arrow indicator. The other component is current quote montage 204. The current quote montage 204 shows for a particular stock two columns (one for bid, one for ask), under which is listed the MMIDs for each registered market maker, ECN, and UTP Exchange in the particular stock and the corresponding quote (price and size) next to the MMID. System 20 ranks the bids and offers along with the corresponding MMID in price/time priority. Accordingly, the market participant at the best bid who is first in time appears first in the montage, the market participant at the best bid (or the next best bid) who is next in time is ranked second, and so forth.

Market makers are required to submit a two sided proprietary quote, and ECNs that participate in System 20 may submit a one or two sided quote. UTP Exchanges that have an interface with System 20 are required under the UTP Plan to submit to System 20 a two sided quote, which represents the exchange specialist's best quote in the stock at issue. While a market maker's quoted price and size is attributed to the market maker by the corresponding MMID, this may not represent the market maker's best price if the market maker has placed a better priced order into an ECN that complies with the Display Alternative Rule. Accordingly, a market maker may be displaying in the current quote montage a proprietary bid of $20 when the market is $20⅛ to 20¼, but the market maker may be displaying in a qualifying ECN a bid of $20 1/16. The $20 1/16 quote may only be seen by subscribers of the ECN in which the market maker has placed the order and is not visible to the system 20 or market participants unless and until $20 1/16 becomes the best bid in the ECN.

Montage with Enhanced Display of Trading Interest

Still referring to FIG. 9, as mentioned above the quote/order collector facility 20 operates with a composite montage that is sent to participant workstations as a graphical user interface. The composite montage 200 includes the current quote montage 204 and aggregate montage 202. The aggregation montage 202 displays a predetermined number of price levels, e.g., the three best price levels 202a-202c on both the bid and offer side of the market. Each price level 202a-202c generally is dynamically updated and provides a display of the aggregate size of "displayed" trading interest ("attributable" and "non-attributable," as explained above) at each price level for both sides of the market e.g., 205, 207.

Referring back to FIG. 1A, the entry format 80 for quotes/orders includes a quote size field 182 and a reserve size field 184. Quoting Market Participants will be able to designate a quote/order as "attributable" or "non-attributable," by an entry in field 186. Both attributable and non-attributable orders are considered "displayable orders" since they are displayed to the system 20 and have the potential for being viewed by market participants. If a quote/order is "attributable," the price and size of the order will be displayed next to the Quoting Market Participant's MMID in the current quote montage (assuming this is the Quoting Market Participant's best priced attributable quote/order), and will also be displayed in the aggregate montage as part of the aggregate trading interest when the price of the quote/order is within the best three price levels.

Alternatively, if a Quoting Market Participant designates an order/quote as "non-attributable," it will be displayed in the aggregate montage as part of the aggregate trading interest when the price of the quote/order is within the best three price levels, but will not be displayed in the current quote montage next to the Quoting Market Participant's MMID. The non-attributable order/quote of the quoting market participant will be displayed in the "SIZE" quote if it is in the best non-attributable quote/order on that side of the market.

Thus, Quoting Market Participants can display trading interest to the market anonymously, without attribution to its MMID, and still be in compliance with SEC Rules. Specifically, market makers will be required to publish in the current quote montage a two sided quote that is attributed to it by MMID. System 20 should satisfy the Display Alternative requirements. That is, if a market maker displays in the aggregate montage a non-attributable proprietary or agency interest that is priced better that its attributable quote/order in current quote montage, this would be consistent with SEC Rules because the better priced non-attributable quote/order will be displayed in System 20 once it is at the best bid/best offer or two price levels away. Additionally, the prices in the aggregate montage will be accessible through traditional execution systems, thus providing equivalent access to the quote.

If a market maker were to place an order into a qualifying ECN, that order would not be displayed in System 20 until it was at the top of the ECN's file. In system 20, however, the market maker's order in the aggregate montage will be displayed when it is within the best three price levels on either side of the market. Thus, the aggregate montage reduces fragmentation and increases transparency in that orders that might not be displayed to the market because they are in an ECN and not at the top of the ECN's book, may now be displayed in System 20. Additionally, system 20 will display in the current quote montage only one MMID (two sided) and one Agency MMID (one or two sided) for each market maker, and one MMID per ECN. Thus, it would be consistent for a market maker to send system 20 a non-attributable proprietary or agency quote/order that is priced better than its attributable quote in the current quote montage. It would also be consistent for a market maker that receives a limit order, which is priced better than the market maker's attributable quote in the aggregate montage, to designate that limit order as non-attributable and display it only in the aggregate montage without updating its quote in the current quote montage). This arrangement and treatment of the order must be consistent with the market maker's best execution obligations and understanding with the customer.

A Quoting Market Participant may indicate that a quote/order has reserve size. Reserve size will apply to a market maker's proprietary as well as Agency Quote, and the market maker must be displaying (either as attributable or non-attributable) 1,000 shares. Reserve size will replenish displayed size (attributable only or non-attributable) by at least 1,000 shares (or a default amount) once displayed size is decremented to zero. Reserve size along with displayed (both attributable and non-attributable) size, will be accessible through system 20. Reserve size, however, will not be displayed in either the aggregate montage or the current quote montage. As described above, system 20 will access reserve size after all displayed size is exhausted.

The current quote montage 204 also includes a special MMID (here referred to as "SIZE") that represents the aggregate size of all non-attributable quotes/orders at the best bid/best offer displayed in the current quote montage 204 along with the other MMIDs for the Quoting Market Participants displaying attributable size at the inside. There is one "SIZE" MMID for the bid and offer side of the market. The aggregate size of the best bid/best offer displayed in the aggregate montage will equal the sum of the SIZE MMID displayed and the individual sizes of the MMIDs at the best bid/best offer displayed in the current quote montage. The "SIZE" MMID is provided to properly calculate and disseminate the System 20 best bid and best offer ("BBO") along with the accompanying market center, e.g., for a national quotation service.

System 20 provides a "Summary Scan" function as part of the aggregate montage. The Summary Scan function is a query function that can provide information at the total displayable size (attributable and non-attributable) for all levels below the three displayable price levels in the aggregate montage. The Summary Scan anonymously displays interest (attributable and non-attributable) at each price level on both sides of the market, but is not dynamically updated.

The current quote montage represents all trading interest that a Quoting Market Participant wishes to attribute to its MMID. This section may be viewed as a way for Quoting Market Participants to advertise their trading interests, which may be at the inside market or one or more ticks away. The current quote montage 204 will be useful for market participants who wish to trade a block or large size at a price that is one or more ticks away from the market. The aggregate montage will allow Quoting Market Participants to display size to the market anonymously, which minimizes certain risks that a market participant encounters when large size is attributable to its MMID. By allowing for the anonymous display of size to the market and by providing a facility that is SEC Order Handling Rule compliant, the aggregate montage will encourage Quoting Market Participants to show greater size, which will increase transparency. Finally, reserve size benefits the market by allowing market participants to provide to system 20 back book trading interest, but not the market in general. This feature will minimize potential market impact of displaying very large size, while enhancing liquidity since reserve size will be electronically accessible.

The system 20 can use "point-and-click" window-type technology so that market participants can enter marketable orders by simply clicking on quotes in the window 200. For example, each of the entries in the window 200 can be a control button so that a simple click on the control, e.g, the total shares displayed 205a (FIG. 4) can activate an execution. The click with a mouse or the like at the inside bid in the top-half of the window 200 could enter a "default" order priced at the displayed price for the displayed shares. The system 20 would allow a trader to set a "default" number of shares, e.g., 1000 shares. For example, whenever trader clicked on the aggregate shares displayed at the inside bid the trader's system 12 would generate an order for 1,000 shares at the inside price. In addition, a "right-click" on the aggregate display would permit a trader to customize the order at the point of entry.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method of generating a user interface comprises:
aggregating by one or more computers attributable and non-attributable interest in a product to provide a total of all attributable and non-attributable interest, for each of a plurality of price levels; and
generating by the one or more computers, a user interface that when displayed on a display device renders the total for at least some of the plurality of price levels of the aggregated attributable and non-attributable interest for the product.

2. The method of claim 1 wherein generating comprises generating the user interface that when displayed, displays three price levels for each side of the market with one of the price levels being the price level corresponding to the inside quote and remaining ones of the price levels being next best price levels in the system for each side of the market.

3. The method of claim 1 wherein the price levels are dynamically changeable depending on market conditions and values of total aggregated interest are displayed in the graphical user interface and change based on market conditions.

4. The method claim 1 wherein generating further comprises:
generating the graphical user interface to have the aggregated attributable and non-attributable interest represented as controls, which when selected by a user can cause an execution against the aggregated attributable and non-attributable interest displayed in the control.

5. The method of claim 1 wherein generating further comprises:
producing a current quote window disposed adjacent an aggregate window that renders the totals for at least some of the price level, with the current quote window rendering attributable quotes of participants in the system.

6. The method of claim 1 wherein generating further comprises:
producing a current quote window that displays attributable quotes of participants in the system and the current quote window further comprises:
a size indicator quote that represents the total non attributable aggregate quote size at a current market price.

7. A computer program product for use in generating a user interface residing on a non-transitory computer readable media comprising executable instructions for causing a computer to:
aggregate attributable and non-attributable interest in a product to provide a total of all attributable and non-attributable interest, for each of a plurality of price levels; and
generate a user interface that when displayed on a display device renders the total for at least some of the plurality of price levels of the aggregated attributable and non-attributable interest for the plurality of price levels of the product.

8. The computer program product of claim 7 wherein instructions to generate comprise instructions to generate the user interface to display when rendered on the display device, three price levels for each side of the market with one being the price levels corresponding to the inside quote and the others being the next best price levels in the system for each side of the market.

9. The computer program product of claim 7 further comprising instructions to:
dynamically change the price levels values of total aggregated interest displayed in the graphical user interface based on market conditions.

10. The computer program product of claim 7 further comprises instructions to:
generate the graphical user interface to have the aggregated attributable and non-attributable interest as controls, which when selected by a user can cause an execution against the aggregated attributable and non-attributable interest displayed in the control.

11. The computer program product of claim 7 wherein instructions to generate further comprises instructions to:
produce a current quote window disposed adjacent an aggregate window that renders the totals for at least some of the price level, with the current quote window rendering attributable quotes of participants in the system.

12. The computer program product of claim 7 wherein instructions to generate further comprises instructions to:
produce a current quote window disposed adjacent the aggregate window, the current quote window renders attributable quotes of participants in the system and a size indicator quote that represents total non attributable aggregate quote size at a current market level.

13. A system comprises:
a processor; and
a computer readable media storing a computer program product for use in trading a product comprising instructions for causing the processor to:
aggregate attributable and non-attributable interest in the product to provide a total of all attributable and non-attributable interest, for each of a plurality of price levels; and
generate a user interface that when rendered on a display device, renders the total for at least some of the plurality of price levels of the aggregated attributable and non-attributable interest in the graphical user interface at the plurality of price levels of the product.

14. The system of claim 13 wherein instructions to generate the aggregated attributable and non-attributable interest comprises instructions to generate three price levels for each side of the market with one being the price level corresponding to the inside quote and the others being the next best price levels in the system for each side of the market.

15. The system of claim 13 further comprising instructions to dynamically change the price levels based on market conditions and values of total aggregated interest.

16. The system of claim 13 wherein instructions to generate further comprises instructions to:
generate the aggregated attributable and non-attributable interest levels as controls in the user interface, which when selected by a user can cause an execution against the aggregated attributable and non-attributable interest displayed in the control.

17. The system of claim 13 wherein instructions to generate further comprises instructions to:
produce a current quote window disposed adjacent an aggregate window, the current quote window displays attributable quotes of participants in the system.

18. The system of claim 13 wherein instructions to generate further comprises instructions to:
generate a current quote window that displays attributable quotes of participants in the system and a size indicator quote that represents total non attributable aggregate quote size at a current market level.

* * * * *